United States Patent Office 3,532,455
Patented Oct. 6, 1970

3,532,455
METHOD FOR PRODUCING SULFURIZED VAT DYES BY THIONATION AND PRODUCTS THEREOF
Fredrik Vidrik Randvere, Manville, N.J., assignor to American Cyanamid Company, Stamford, Conn., a corporation of Maine
No Drawing. Continuation-in-part of application Ser. No. 413,601, Nov. 24, 1964. This application Sept. 19, 1967, Ser. No. 668,935
Int. Cl. C09b *49/10*
U.S. Cl. 8—37                                     8 Claims

ABSTRACT OF THE DISCLOSURE

A liquid sulfurized dye, useful for application as a vat dye, is prepared by thionating an N-p-hydroxyphenylnaphthylamine in an aqueous lower alkyl glycol ether vehicle at a temperature of from 140 to 180° C., using in the thionation mix for each 24 parts of the N-p-hydroxyphenylnaphthylamine, 12 to 16 parts of sulfur, 6 to 9 parts of 60% sodium sulfide and 8 to 15 parts of an alkali metal salt of an alkyl aryl sulfonic acid hydrotropic agent selected from the group consisting of xylene sulfonic acid and ethylbenzene sulfonic acid.

---

This application is a continuation-in-part of application, Ser. No. 413,601, filed Nov. 24, 1964, now abandoned.

This invention relates to improved dyes and to a method for preparing the same. More particularly, it relates to improved sulfurized vat dyes derived from N-p-hydroxyphenyl 1- and 2-naphthylamines.

Sulfur dyes are water-insoluble products, generally of indefinite chemical constitution, formed by fusion or thionation under a variety of conditions of various organic intermediates with sodium sulfide, sodium polysulfide and/or sulfur.

They are normally prepared for dyeing cellulosic fibers by solution in aqueous sodium hydroxide and sodium sulfide. In this reduced soluble form, they may be applied to cellulosic fibers by exhaust methods and after exhaustion onto the fiber, the dye is oxidized in and on the fiber back to the original color dye.

Some of the sulfur colors may also be applied by vat methods using the application method generally most applicable for vat dyes. This involves formation of a solution of the reduced form of the sulfur dye in a strongly alkaline solution of sodium hydrosulfite, applying it to the fiber by ordinary vat methods and then reoxidizing on the cloth.

The application by vat methods often involves certain advantages. However, most of the known thionation products of the N-p-hydroxyphenyl-2-naphthylamine which can be dyed satisfactorily from a sodium sulfide bath become partly destroyed and/or give very poor results when applied as vat dyes from a strongly alkaline hydrosulfite bath. It is sometimes desirable, however, to apply the dyes by vat methods rather than sulfur methods to minimize tendering which sometimes results by sulfur methods. In addition, dyes which may be applied by vat methods without loss of strength or change of shade are desirable since they may be blended with other vat dyes; or may be applied at the same time as vat dyes. Also, certain sulfur dyes, when applied by vat methods, give dyeings with better wash fastness.

Accordingly, it is an object of this invention to provide new sulfur dyes which are suitable for application by vat methods. It is also an object to provide a method for preparing such dyes. Other and further objects will become apparent from the following detailed description.

The present invention is based on the discovery of a process for the preparation for improved sulfurized dyes which may be applied from strongly alkaline hydrosulfite dye baths at high temperatures (vat methods) giving improved shades with high color value and high light fastness, wash fastness and chlorine fastness.

In the past, sulfur dyes and sulfurized vat dyes have been prepared from p-hydroxyphenyl-2-naphthylamine by thionation under a variety of conditions. In many instances, dyes with satisfactory color value and fastness are not obtained. The improved process of this invention involves a combination of specific factors with respect to the method of preparation of the thionation polysulfide, particularly in relation to ratio of sulfur to naphthylamine derivative, proportions of other reagents and the thionation temperature. By the use of this method, liquid sulfur dyes suitable for vat applications giving superior results are obtained.

The process of this invention thus involves thionation of a p-hydroxyphenylnaphthylamine in an aqueous lower alkyl glycol ether vehicle using starting materials in certain proportions and in the presence of one of two hydrotropic agents, particularly the alkali metal salts of xylene sulfonic acid and p-ethylbenzene sulfonic acid. Thus using as a basis, 24 parts of p-hydroxyphenylnaphthylamine, i.e., either p-hydroxyphenyl-1-naphthylamine or p-hydroxyphenyl-2-naphthylamine, as the starting intermediate, the features for the improved thionation process carried out in an aqueous lower alkyl glycol ether vehicle may be set forth as follows:

12 to 16 parts sulfur
6 to 9 parts 60% sodium sulfide
8 to 15 parts of a hydrotropic agent (salts of xylene sulfonic acids or ethylbenzene sulfonic acid)

The sulfur usage ratio as indicated is particularly critical for good results, that is the ratio of 0.5 to 0.67 part of sulfur per part of naphthylamine derivative.

In addition to providing high quality and strength of dyestuff, the use of the relatively low sulfur ratio in distinction to the high ratios of prior art processes makes it possible to carry out the preparation of the liquid vat dye in situ without after treatments such as oxidation and filtration as are necessary to remove excess polysulfide and sodium thiosulfate from the liquid dyestuff when large amounts of sulfur have been used for the thionation.

As the main vehicle, lower alkyl ethers of glycols are suitable. However, Carbitol (monoethyl ether of diethylene glycol) is preferred. This particular type of solvent is important, as shown by the fact that only about 50% of the color value as a vat dye results when using triethylene glycol instead of Carbitol.

The amount of water used in the mixture is not necessarily critical; large amounts of water produce weaker colors and redder shades. It may be pointed out that 5–30 parts of water may be considered a practical range for use in the starting thionation mixture; the amount of water is reduced by evaporation in the thionation process to about 3 parts.

To achieve the desirable results of the improved process of the invention, certain hydrotropic agents are particularly suitable, i.e., salts of xylene sulfonic acids and ethylbenzene sulfonic acids.

In this type of reaction, various hydrotropic and surface active agents have been used in the past and useful dye products have been obtained. However, to achieve superior results, the two agents mentioned above are used. This is especially true for high color value and clearer shades.

For best results, it is preferred that the preparation of the polysulfide solution for thionation be completed prior to the addition of the base intermediate.

The thionation is conducted at temperatures of 140 to 180° C. These temperatures are easily reached by virtue of the lower sulfur ratios employed and the use of a high boiling solvent in the process. Although the thionation temperature may be varied between 140 and 180° C., depending on the nature of the dyestuff desired, a preferred temperature range is 140 to 160° C. These thionation temperatures, which are higher than those conventionally used for solution thionation procedures, are critical to the present process in that dyes having superior vat dye properties are formed only at these higher thionation temperatures. In addition to substantial increase in color value, superiority in wash and chlorine fastness also results using the high thionation temperatures. Furthermore, the high thionation temperatures allow dye formation to be completed in shorter time resulting in considerably shorter time cycles during manufacture.

After the thionation is completed, the thionation mixture may be diluted with water, a hydrotropic agent and a minimum amount of a reducing agent such as an alkaline material or ammonium sulfide, hydrosulfide, or hydrosulfite to give a complete and stable solution of the liquid dye which is then suitable for applying from an alkaline hydrosulfite vat.

Whereas prior methods gave dyes which showed inferior results when applied by vat methods, the present process gives dyes which can be applied to give about equally good results using either sulfur or vat dyeing methods.

The invention is illustrated by the following examples in which all parts are by weight.

EXAMPLE 1

A mixture of 8.3 grams of sodium sulfide flakes, 10 grams of water, 55 grams of the monoethyl ether of diethylene glycol and 10 grams of sodium ethyl benzene sulfonate was stirred and heated to 70° C. Then 14.4 grams of sulfur was added gradually over a half hour period at 70 to 80° C. The mixture was then stirred at 105° C. to form a complete solution. Then 24 grams N-(p-hydroxyphenyl)-2-naphthylamine was added; the mixture was then heated and solvent was evaporated until the mixture reached 170° C. It was then stirred at the reflux temperature (165–175° C.) for about 20 hours.

After the mixture was allowed to cool to 100° C., 100 grams of water, 28 grams of sodium sulfide and 10 grams of ethyl benzene sodium sulfonate were added to the mixture. After stirring 30 minutes at 70 to 80° C., 28 grams of 50% aqueous sodium hydroxide solution was added and the weight adjusted to 270 g. with water.

The liquid dye composition when applied either as a sulfur dye or as a vat dye from an alkaline hydrosulfite vat gives superior full uniform olive-black shades with excellent wash fastness and light fastness. Dyed as a vat on cotton at 20%, a fastness test showed: AATCC Cotton Mash Test No. 4, Hue 4.

By comparison, a liquid sulfur dye prepared by a typical prior art method (Example 1 of U.S. Pat. No. 2,657,112) gives a completely different shade and loses 40 to 50% of its strength when applied as a vat dye rather than a sulfur dye.

EXAMPLE 2

Example 1 is repeated with 10 parts of sodium xylene sulfonate in place of the 10 parts of sodium ethyl benzene sulfonate. Substantially similar results are obtained, although the results with sodium ethyl benzene sulfonate are superior.

EXAMPLE 3

A mixture of 8.3 parts of sodium sulfide flakes, 10 parts of water and 55 parts of the monoethyl ether of diethylene glycol is stirred and heated to 70° C. Then, 14.7 parts of sulfur is added gradually over a half-hour period at 70 to 75° C. The mixture is then stirred at 105° C. to form a complete solution. Then 10 parts of sodium ethyl benzene sulfonate, 1.5 parts of a dispersing agent (Tamol, a formaldehyde-sodium naphthalene sulfonate condensation product) and 24 parts N-(p-hydroxyphenyl)-1-naphthylamine are added. The mixture is then heated allowing water and solvent to evaporate and starting at 140° C., it is heated one hour. More water is then allowed to evaporate until a temperature of 175° C. is reached. It is then stirred at reflux (175° C.) for eight hours.

After cooling, 7 parts of sodium sulfide flakes, 45 parts of water and 3.5 parts of sodium ethyl benzene sulfonate are added and the mixture is stirred until a clear solution results.

The liquid dye composition gives deep bluish-black colors of high strength on cellulosic fibers when applied from an alkaline hydrosulfite bath at 195° F.; similar results are also obtained when applied as a sulfur dye.

Dyed as a vat on cotton at 30%, fastness tests showed:

AATCC Cotton Mash Test No. 4:
  Hue ------------------------------------- 4
  Strength -------------------------------- 4–5
  Lightfastness --------------------------- 6+

EXAMPLE 4

The procedure of Example 3 is followed except that 100 parts of monoethyl ether of ethylene glycol is used in place of the 100 parts of the ethyl ether of diethylene glycol. Similar results are obtained.

I claim:

1. In a method for producing sulfurized vat dyes by thionation of an N-p-hydroxyphenylnaphthylamine selected from the group consisting of N-p-hydroxyphenyl-1-naphthylamine and N-p-hydroxyphenyl-2-naphthylamine in an aqueous lower alkyl glycol ether vehicle, the improvement which comprises conducting the thionation at a temperature of 140 to 180° C., and using in the thionation mix for each 24 parts of N-p-hydroxyphenylnaphthylamine, 12 to 16 parts of sulfur, 6 to 9 parts of 60% sodium sulfide and 8 to 15 parts of an alkali metal salt of an alkylarylsulfonic acid hydrotropic agent selected from the group consisting of xylene sulfonic acid and ethylbenzene sulfonic acid.

2. The method of claim 1 wherein the N-p-hydroxyphenylnaphthylamine is N - p - hydroxyphenyl-1-naphthylamine.

3. The method of claim 1 wherein the N-p-hydroxyphenylnaphthylamine is N - p-hydroxyphenyl-2-naphthylamine.

4. The method of claim 1 wherein the glycol ether is the monoethyl ether of diethylene glycol and the alkylarylsulfonate is sodium ethyl benzene sulfonate.

5. A sulfurized vat dye produced in accordance with the method of claim 1.

6. A sulfurized vat dye produced in accordance with the method of claim 2.

7. A sulfurized vat dye produced in accordance with the method of claim 3.

8. A sulfurized vat dye produced in accordance with the method of claim 4.

References Cited

UNITED STATES PATENTS 2,657,112  10/1953  Robinson et al. _____ 8—37

GEORGE F. LESMES, Primary Examiner

P. C. IVES, Assistant Examiner

U.S. Cl. X.R.

260—133, 93, 89